US012627205B2

(12) United States Patent
Kitahara et al.

(10) Patent No.: US 12,627,205 B2
(45) Date of Patent: May 12, 2026

(54) METHOD FOR MANUFACTURING ROTOR

(71) Applicant: TOYOTA BOSHOKU KABUSHIKI KAISHA, Aichi-ken (JP)

(72) Inventors: Makoto Kitahara, Toyota (JP); Masaki Sugiyama, Okazaki (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 99 days.

(21) Appl. No.: 18/641,559

(22) Filed: Apr. 22, 2024

(65) Prior Publication Data

US 2024/0364192 A1     Oct. 31, 2024

(30) Foreign Application Priority Data

Apr. 25, 2023     (JP) ................................. 2023-071631

(51) Int. Cl.
H02K 15/03          (2025.01)
H02K 15/12          (2006.01)

(52) U.S. Cl.
CPC ............. H02K 15/03 (2013.01); H02K 15/12 (2013.01); H02K 2201/09 (2013.01)

(58) Field of Classification Search
CPC ........ H02K 1/276; H02K 15/12; H02K 15/03; H02K 2201/09; B29C 45/14; B29C 45/14008
See application file for complete search history.

(56) References Cited

U.S. PATENT DOCUMENTS

| | | | |
|---|---|---|---|
| 2017/0012510 A1* | 1/2017 | Hattori | ..................... H02K 1/27 |
| 2023/0387737 A1* | 11/2023 | Yamane | ................. H02K 15/03 |

FOREIGN PATENT DOCUMENTS

| | | |
|---|---|---|
| JP | 2015-192575 | 11/2015 |

* cited by examiner

*Primary Examiner* — Monica A Huson
(74) *Attorney, Agent, or Firm* — Greenblum & Bernstein, P.L.C.

(57)          ABSTRACT

A method for manufacturing a rotor includes, with a magnet accommodated in a magnet housing hole of a rotor core, causing a first die to contact a first end face of the rotor core and causing a second die to contact a second end face of the rotor core. The method also includes injecting the thermoplastic into the magnet housing hole through a passage of the second die in a state in which the first die and the second die are respectively in contact with the first end face and the second end face and the first die is heated.

8 Claims, 5 Drawing Sheets

METHOD FOR MANUFACTURING ROTOR

BACKGROUND

1. Field

The present disclosure relates to a method for manufacturing a rotor.

2. Description of Related Art

The rotor of a typical magnet-embedded rotor includes a rotor core having magnet housing holes, and magnets accommodated in the magnet housing holes. The magnets are fixed to the rotor core with plastic filling the magnet housing holes.

The plastic for filling the magnet housing holes may be a thermosetting plastic or a thermoplastic. Thermoplastics generally have a higher viscosity when melted than thermosetting plastics. Thus, the injection pressure required when filling magnet housing holes with thermoplastic using an injection device is more likely to increase than when filling magnet housing holes with thermosetting plastic. As a result, the rotor core may be deformed by the injection pressure of the thermoplastic.

Japanese Laid-Open Patent Publication No. 2015-192575 discloses a method for manufacturing a rotor that injects thermoplastic into magnet housing holes in a state in which the outer circumferential surface of a rotor core is heated using a heating die. The heating die includes slide core blocks that are slidable in the radial direction of the rotor core. Each slide core block heats the outer circumferential surface of the rotor core while pressing the outer circumferential surface of the rotor core from the radially outer side.

When the rotor core is heated by the heating die, the temperature of the thermoplastic is unlikely to decrease. Thus, the magnet housing holes are filled with the thermoplastic while limiting an increase in the viscosity of the thermoplastic. This limits an increase in the injection pressure of the thermoplastic and thus limits deformation of the rotor core.

The method for manufacturing a rotor disclosed in the above-described publication requires a heating die having multiple slide core blocks. This may complicate the structure of the manufacturing apparatus for manufacturing a rotor.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method for manufacturing a rotor is provided. The rotor includes a rotor core that includes a magnet housing hole and a magnet that is accommodated in the magnet housing hole and fixed to the rotor core with a thermoplastic.

The rotor core has a first end face and a second end face, which is located on a side opposite to the first end face. The magnet housing hole opens in the first end face and the second end face. The method includes, with the magnet accommodated in the magnet housing hole, causing a first die to contact the first end face and causing a second die to contact the second end face, the second die including a passage through which the thermoplastic flows. The method also includes injecting the thermoplastic into the magnet housing hole through the passage in a state in which the first die and the second die are respectively in contact with the first end face and the second end face and the first die is heated.

Other features and aspects will be apparent from the following detailed description, the drawings, and the claims.

BRIEF DESCRIPTION OF THE DRAWINGS

FIG. 6 is a cross-sectional view illustrating a state in which a first die and a second die are clamped.

FIG. 7A is a cross-sectional view illustrating a state before the rotor core is pressed by the second die.

FIG. 7B is a cross-sectional view illustrating a state in which the rotor core is pressed by the second die.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A method for manufacturing a rotor according to one embodiment will now be described with reference to FIGS. 1 to 8.

Rotor 10

Figure 1:
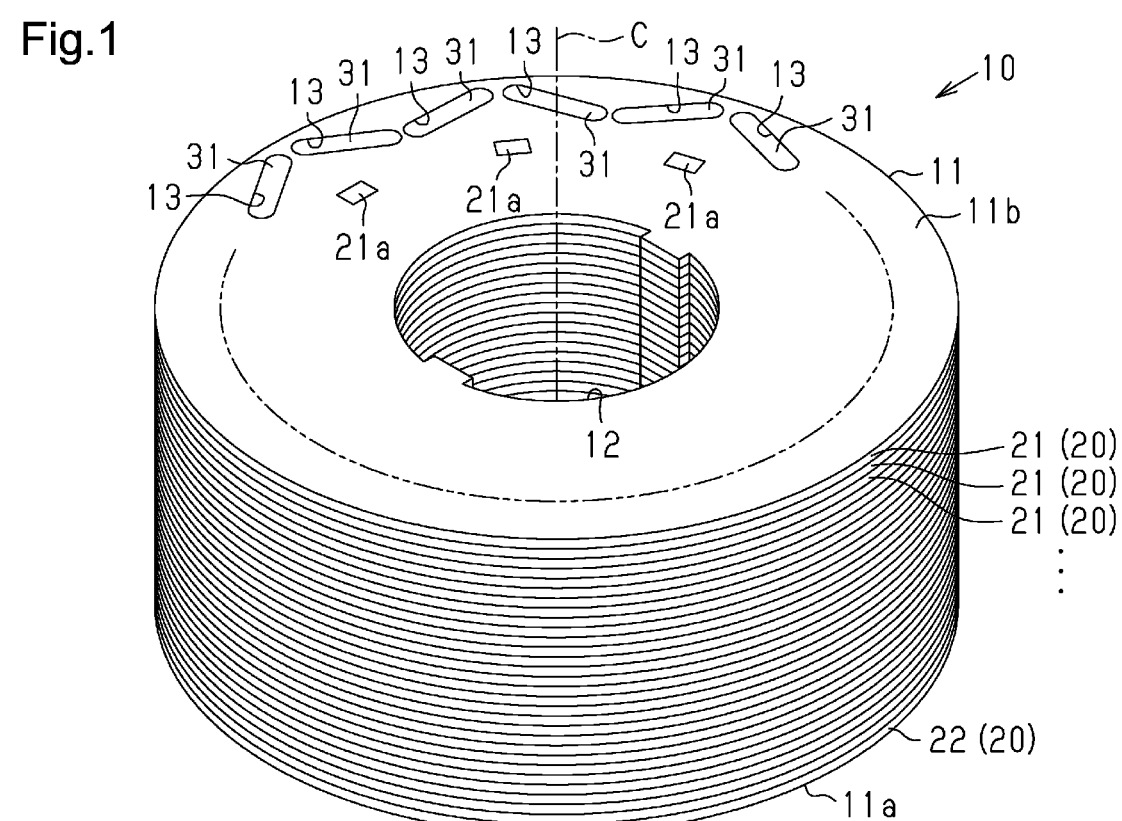
FIG. 1 is a perspective view of a rotor that is manufactured through a manufacturing method according to one embodiment.
Figure 2:
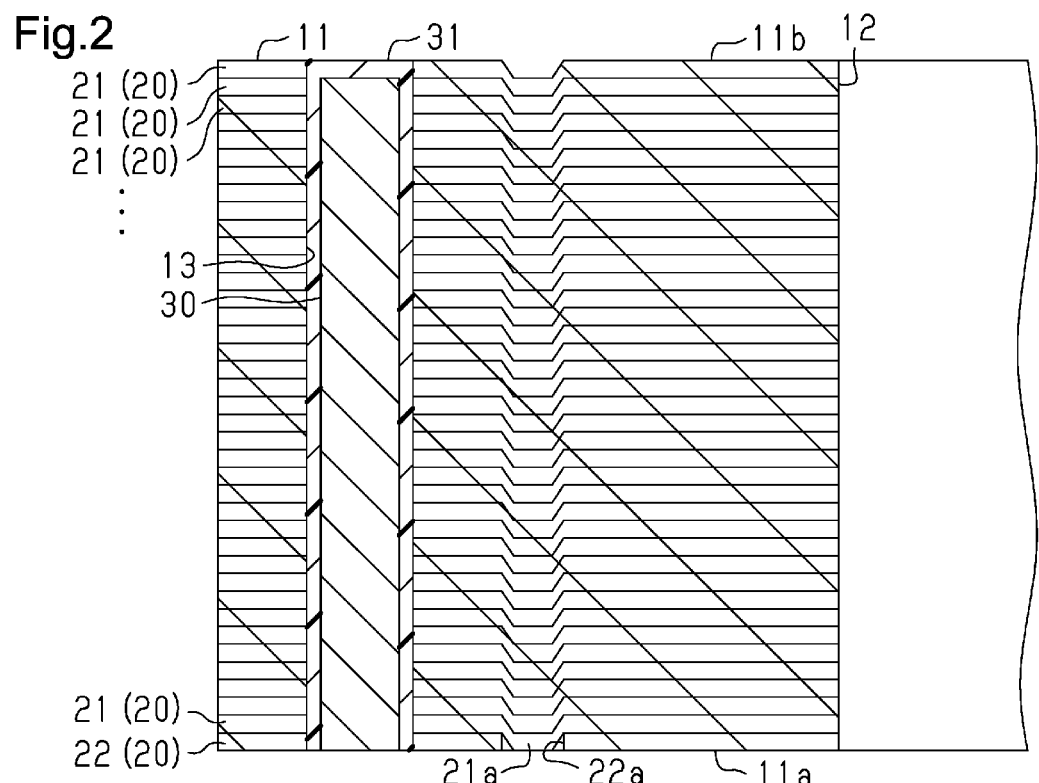
FIG. 2 is a cross-sectional view of the rotor shown in FIG. 1.

As shown in FIGS. 1 and 2, a rotor 10 includes a rotor core 11, magnets 30, and plastic 31. The rotor 10 is, for example, a magnet-embedded rotor.

The rotor core 11 is substantially shaped as a cylinder having an axis C as the central axis. The rotor core 11 is formed, for example, by stacking iron core pieces 20 that are punched out from a magnetic steel sheet.

In the following description, the direction in which the iron core pieces 20 are stacked will simply be referred to as a stacking direction. The stacking direction agrees with the direction in which axis C extends. The radial direction of the rotor core 11 with respect to the axis C will simply be referred to as a radial direction. The circumferential direction of the rotor core 11 with respect to the axis C will simply be referred to as a circumferential direction.

The rotor core 11 includes a first end face 11*a* and a second end face 11*b*, which are located on opposite sides in the stacking direction.

The rotor core 11 includes a center hole 12, into which a shaft (not shown) is inserted, and magnet housing holes 13, in which magnets 30 are accommodated. The center hole 12 and the magnet housing holes 13 extend through the rotor core 11 in the stacking direction. That is, the center hole 12 and the magnet housing holes 13 open both in the first end face 11*a* and the second end face 11*b*.

The iron core pieces 20 include first iron core pieces 21 and a second iron core piece 22. The rotor core 11 is formed by, for example, stacking multiple first iron core pieces 21 and one second iron core piece 22. The second iron core piece 22 forms one end face in the stacking direction of the rotor core 11. The second iron core piece 22 forms, for example, the first end face 11*a* of the rotor core 11.

As shown in FIG. 2, each first iron core piece 21 includes tabs 21*a* that bulge toward one side in the stacking direction. The tabs 21*a* are arranged at equal intervals in the circumferential direction of each first iron core piece 21. The first iron core pieces 21 adjacent to each other are coupled together by press-fitting the tabs 21*a* in the first iron core pieces 21 to each other.

The second iron core piece 22 includes through-holes 22*a* extending through the second iron core piece 22 in the stacking direction. The through-holes 22*a* are arranged at equal intervals in the circumferential direction of the second iron core piece 22. The through-holes 22*a* each correspond to one of the tabs 21*a* of the corresponding first iron core piece 21.

The first iron core piece 21 and the second iron core piece 22 are coupled to each other by inserting the tabs 21*a* into the corresponding through-holes 22*a*.

The magnets 30 are respectively accommodated in the magnet housing holes 13.

Each magnet 30 has an elongated shape extending in the stacking direction. The magnets 30 have a substantially rectangular cross-sectional shape orthogonal to the stacking direction.

The rotor core 11 has a stacking height, which is the dimension from the first end face 11*a* to the second end face 11*b*. The length of each magnet 30 in the stacking direction is less than the stacking height of the rotor core 11.

Each magnet 30 includes a first end face and a second end face, which face in opposite directions from each other in the stacking direction. The first end face of each magnet 30 is, for example, flush with the first end face 11*a* of the rotor core 11. The second end face of each magnet 30 is located inward from the second end face 11*b* of the rotor core 11 in the stacking direction.

The magnets 30 are fixed to the rotor core 11 with the plastic 31 filling the magnet housing holes 13. The plastic 31 is located between the outer peripheral surface of each magnet 30 and the inner circumferential surface of the corresponding magnet housing hole 13. The plastic 31 covers the second end face of the magnet 30.

The plastic 31 is, for example, a thermoplastic such as a liquid-crystal polymer.

Manufacturing Apparatus 40

A manufacturing apparatus 40 for manufacturing the rotor 10 will now be described.

The manufacturing apparatus 40 is used to fill the magnet housing holes 13 of the rotor core 11, which accommodate the magnets 30, with the plastic 31 and harden the plastic 31.

Figure 3:
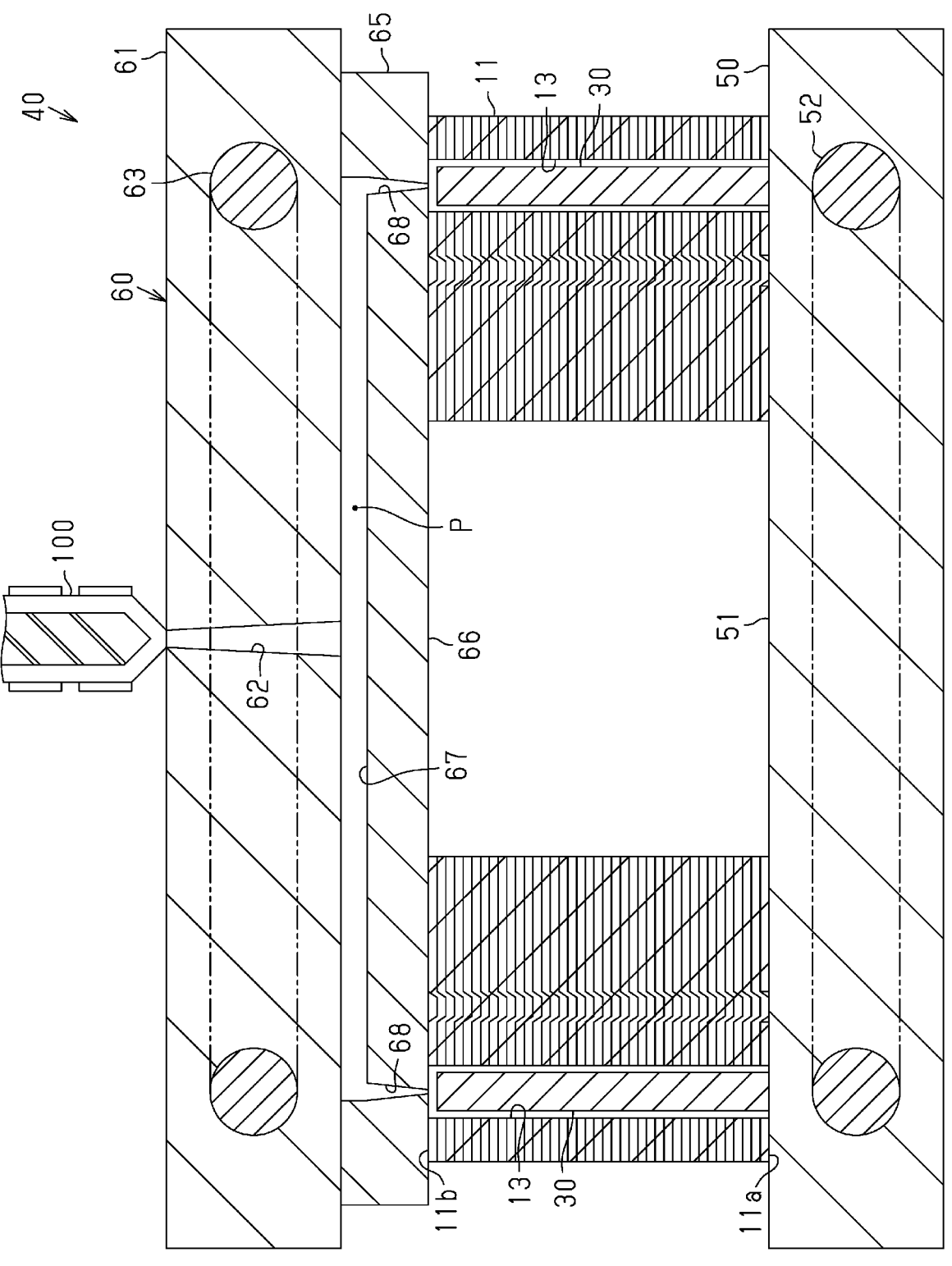
FIG. 3 is a cross-sectional view illustrating an apparatus for manufacturing the rotor shown in FIG. 1.

As shown in FIG. 3, the manufacturing apparatus 40 includes a first die 50 and a second die 60.

First Die 50

The first die 50 is, for example, a fixed die.

The first die 50 includes a first contacting surface 51, which contacts the first end face 11*a* of the rotor core 11. The first contacting surface 51 is flat. The first contacting surface 51 has a size that covers the openings of all the magnet housing holes 13 that open in the first end face 11*a*.

The first die 50 incorporates, for example, a first heater 52, which generates heat when energized.

Second Die 60

The second die 60 includes a die body 61 and a gate plate 65. The die body 61 is, for example, formed separately from the gate plate 65. The die body 61 is, for example, a movable die that is capable of approaching and moving away from the first die 50.

The die body 61 includes a sprue 62, through which the plastic 31 injected from an injection device 100 flows through.

The die body 61 incorporates, for example, a second heater 63, which generates heat when energized.

Gate Plate 65

The gate plate 65 is disposed between the die body 61 and the rotor core 11. The gate plate 65 includes a second contacting surface 66, which contacts the second end face 11*b* of the rotor core 11. The second contacting surface 66 is flat. The second contacting surface 66 has a size that covers the openings of all the magnet housing holes 13 that open in the second end face 11*b*.

The gate plate 65 includes multiple runners 67, which are connected to the sprue 62, and multiple gates 68, which respectively extend from the runners 67.

The runners 67 open in a surface of the gate plate 65 on a side opposite to the second contacting surface 66. The runners 67 extend radially from a central portion of the gate plate 65. Each gate 68 opens in the second contacting surface 66. Each gate 68 corresponds to one of the magnet housing holes 13. Each gate 68 connects the end of the runner 67 to the corresponding magnet housing hole 13.

Method for Manufacturing Rotor 10

The method for manufacturing the rotor 10 includes a crushing step, a first arranging step, a second arranging step, a third arranging step, a pressing step, a heating step, an injection step, and a hardening step. The crushing step, the first arranging step, the second arranging step, the third arranging step, the pressing step, the heating step, the injection step, and the hardening step are performed in that order.

Crushing Step

Figure 4:
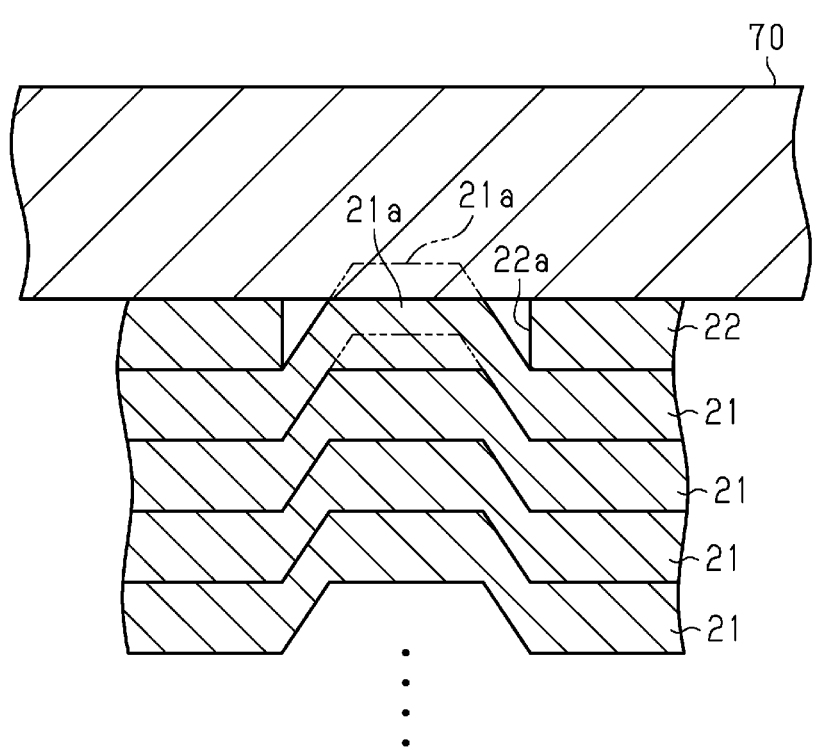
FIG. 4 is a cross-sectional view illustrating a state in which a tab is crushed.

As indicated by the long-dash double-short-dash lines in FIG. 4, when the first iron core pieces 21 and the second iron core piece 22 are joined together through press-fitting, the protruding ends of the tabs 21*a* of the first iron core piece 21 adjacent to the second iron core piece 22 may protrude outward from the through-holes 22*a* of the second iron core piece 22.

In the crushing step, a pressing jig 70 presses the protruding ends of the tabs 21*a*, which protrude from the through-holes 22*a* of the second iron core pieces 22, so that the tabs 21*a* are crushed. In the crushing step, the tabs 21*a* are crushed such that the protruding end of each tab 21*a* is located inside the through-hole 22*a*, that is, such that the tab 21*a* does not protrude beyond the first end face 11*a* of the rotor core 11.

First Arranging Step

Figure 5:
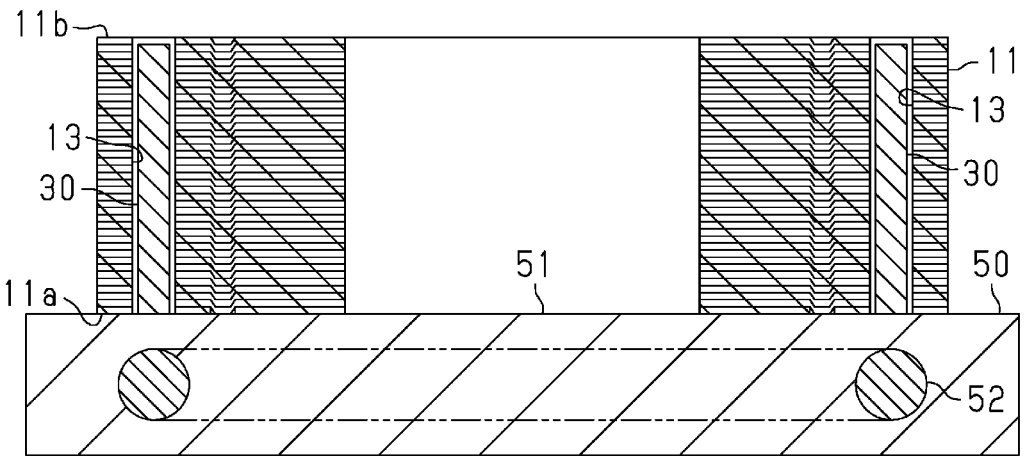
FIG. 5 is a cross-sectional view showing a state in which a rotor core is placed on a first die.

In the first arranging step, the rotor core 11, which accommodates the magnets 30 in the magnet housing holes 13, is placed on the first contacting surface 51 of the first die 50 as shown in FIG. 5. At this time, the first contacting surface 51 entirely covers the first end face 11*a*. That is, the first contacting surface 51 closes all the openings of the magnet housing holes 13 that open in the first end face 11*a*. At this time, the lower surface, which is the first end face, of each magnet 30 is in contact with the first contacting surface 51. Also, the upper surface of each magnet 30, which is the second end face, is located below the second end face 11*b*. In the first arranging step, the rotor core 11 may be placed on the first die 50 such that the second end face 11*b* contacts the first contacting surface 51.

Second Arranging Step

Figures 6, 7A, 7B:
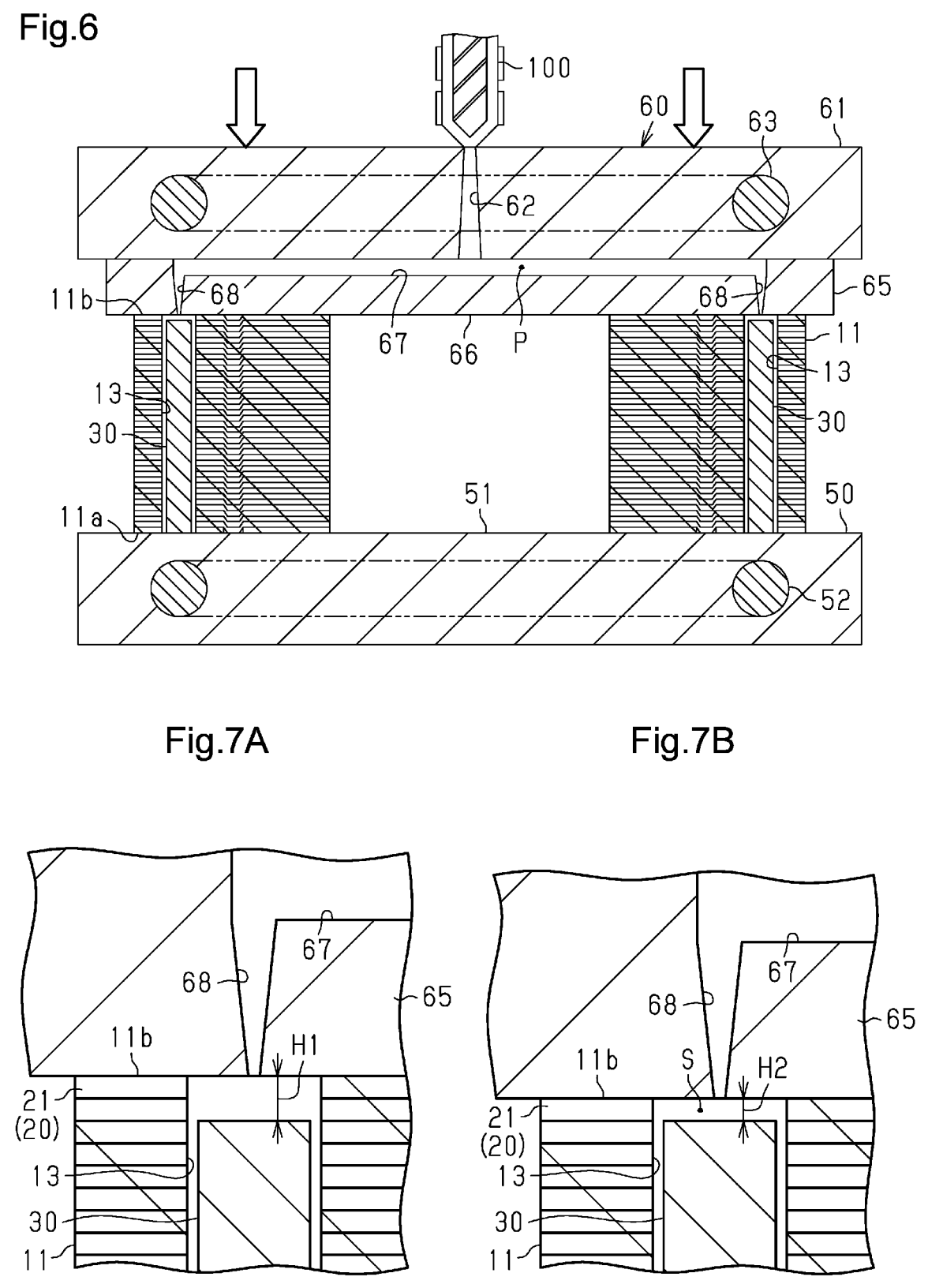

As shown in FIG. 6, in the second arranging step, the gate plate 65 is placed on the second end face 11*b* of the rotor core 11. At this time, the second contacting surface 66 entirely covers the second end face 11*b*, and each gate 68 is connected to the corresponding magnet housing hole 13. Each gate 68 is, for example, disposed at a position facing the upper surface of the corresponding magnet 30.

Third Arranging Step

In the third arranging step, the die body 61 contacts the gate plate 65 from the side opposite to the rotor core 11. This connects the sprue 62 of the die body 61 to the runners 67 of the gate plate 65.

Pressing Step

In the pressing step, the first die 50 and the second die 60 are clamped to press the second end face 11*b* with the second die 60, so that the first end face 11*a* is pressed against the first die 50. In the pressing step, the die body 61 presses the second end face 11*b* with the gate plate 65 in between.

In the rotor core 11, in which the iron core pieces 20 are stacked in a state in which the tabs 21*a* are press-fitted to each other, a slight gap may be created between each adjacent pair of the iron core pieces 20. When the second end face 11*b* of the rotor core 11 in this state is pressed by the second die 60, the iron core pieces 20 are brought into close contact with each other such that the gaps between the iron core pieces 20 are eliminated. This reduces the stacking height of the rotor core 11.

As shown in FIGS. 7A and 7B, as the stacking height of the rotor core 11 decreases, the distance in the stacking direction from the second end face 11*b* of the rotor core 11 to the upper surface of each magnet 30 is reduced from a distance H1 to a distance H2. That is, in the pressing step, a flow space S, through which the plastic 31 flows, is created between the gate plate 65 and the magnet 30 in the stacking direction, while reducing the stacking height of the rotor core 11 by pressing the second end face 11*b* with the second die 60. The plastic 31 discharged from each gate 68 is introduced into the magnet housing hole 13 through the flow space S.

If the pressing force applied by the second die 60 is relatively small in the pressing step, the plastic 31 may leak from the magnet housing holes 13 through gaps between the iron core pieces 20. If the pressing force applied by the second die 60 is relatively large, the springback of each iron core piece 20 may increase the stacking height of the rotor core 11 when the pressing force stops being applied after the plastic 31 filling the magnet housing holes 13 hardens. At this time, gaps are created between the iron core pieces 20 due to the springback. Thus, the pressing force applied by the second die 60 is set to a magnitude that prevents the plastic 31 from leaking out of the magnet housing holes 13 and prevents gaps from being created between the iron core pieces 20 due to the springback.

Heating Step

In the heating step, the first die 50 is heated by energizing the first heater 52, and the die body 61 of the second die 60 is heated by energizing the second heater 63. For example, the heating temperatures of the first die 50 and the die body 61 are set to be the same temperature. The heating temperatures of the first die 50 and the die body 61 are set to, for example, be lower than or equal to the glass transition temperature of the plastic 31.

In the heating step, the first die 50 and the die body 61 are heated for a specified amount of time. The gate plate 65 is heated through the die body 61.

Injection Step

Figure 8:
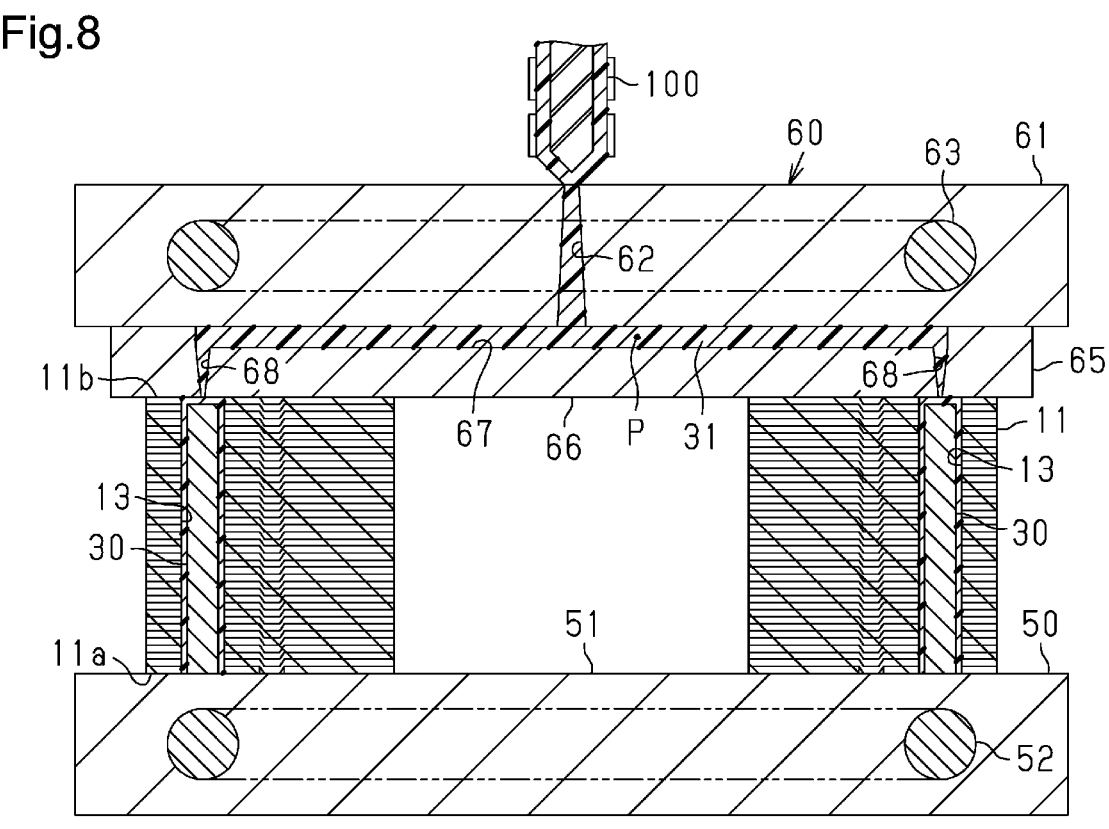
FIG. 8 is a cross-sectional view illustrating a state in which plastic is injected into the magnet housing holes.

As shown in FIG. 8, in the injection step, the injection device 100 injects the plastic 31 into each magnet housing hole 13 via a passage P in the second die 60. Specifically, the plastic 31 injected from the injection device 100 is injected into the magnet housing holes 13 via the sprue 62, the runners 67, and the gates 68. This fills the magnet housing holes 13 with the plastic 31.

In the injection step, the plastic 31 is injected in a state in which the pressing of the second die 60 in the pressing step is continued. That is, in the injection step, the plastic 31 is injected in a state in which the first end face 11*a* of the rotor core 11 is pressed against the first contacting surface 51 of the first die 50.

In the injection step, the plastic 31 is injected in a state in which the heating of the first die 50 and the die body 61 is continued in the heating step.

Hardening Step

In the hardening step, for example, the heating of the first die 50 and the die body 61 is stopped so that the rotor core 11 is air-cooled. This hardens the plastic 31 filling the magnet housing holes 13. The rotor 10 is manufactured in this manner.

Finally, the rotor 10 is removed from the space between the first die 50 and the second die 60.

Operation of the present embodiment will now be described.

The magnet housing holes 13 is filled with the plastic 31, which is thermoplastic, via the passage P in the second die 60, which contacts the second end face 11*b* of the rotor core 11. The temperature of the injected plastic 31 decreases as it travels from the second end face 11*b* toward the first end face 11*a* inside each magnet housing hole 13. In the injection step, the plastic 31 is injected into the magnet housing holes 13 in a state in which the rotor core 11 is heated by the first die 50, which contacts the first end face 11*a* of the rotor core 11. Accordingly, the temperature of the plastic 31 is unlikely to decrease when the plastic 31 travels toward the first end face 11*a* from the second end face 11*b* in each magnet housing hole 13. This limits an increase in the viscosity of the plastic 31. As a result, an increase in the injection pressure of the plastic 31 is limited, so that deformation of the rotor core 11 is limited.

The present embodiment has the following advantages.

(1) In the injection step, the plastic 31 is injected into the magnet housing holes 13 in a state in which the first die 50 is heated.

With the above-described method, it is unnecessary to provide an apparatus such as a slide core block, which presses the outer circumferential surface of the rotor core 11, in order to limit deformation of the rotor core 11. This prevents the structure of the manufacturing apparatus 40 for manufacturing the rotor 10 from being complicated.

(2) In the injection step, the plastic 31 is injected into the magnet housing holes 13 in a state in which the second die 60 is heated.

With the above-described method, the heating of the second die 60 limits a decrease in the temperature of the plastic 31 when the plastic 31 passes through the passage P. Thus, the temperature of the plastic 31 is unlikely to decrease before the plastic 31 reaches the magnet housing holes 13. This further limits an increase in the injection pressure of the plastic 31.

(3) In the injection step, the plastic 31 is injected into the magnet housing holes 13 in a state in which the first end face 11a is pressed against the first die 50.

With the above-described method, the first end face 11a of the rotor core 11 is pressed against the first die 50, so that the contact area between the first die 50 and the first end face 11a increases. Also, the air layer between the first die 50 and the first end face 11a is reduced. This allows the heat of the heated first die 50 to be readily transferred to the rotor core 11. This shortens the time required to raise the temperature of the rotor core 11 to a desired temperature.

(4) In the pressing step, the second end face 11b is pressed such that the iron core pieces 20 are brought into close contact with each other in the stacking direction to reduce the stacking height of the rotor core 11, and that the flow space S is created between the second die 60 and each magnet 30 in the stacking direction.

If gaps exist between adjacent iron core pieces 20 in the stacking direction, the plastic 31 may leak from the gaps in the injection step. In this case, the injection step may be performed with the rotor core 11 pressed in order to eliminate the gaps between the iron core pieces 20. However, if the rotor core 11 is pressed to excessively reduce the stacking height of the rotor core 11, the second die 60 may contact the end faces of the magnets 30 accommodated in the magnet housing holes 13. In this case, since the passage P of the second die 60 is closed by the end faces of the magnets 30, the magnet housing holed 13 may fail to be filled with the plastic 31. Leakage of the plastic 31 from gaps between the iron core pieces 20 is particularly noticeable in the case of thermoplastic in which the injection pressure is more likely to be higher than in the case of a thermosetting plastic.

In this regard, in the above-described method, the iron core pieces 20 are brought into close contact with each other by pressing the rotor core 11. This reduces the stacking height of the rotor core 11, but ensures the flow space S between the second die 60 and each magnet 30. This allows the plastic 31 to fill the magnet housing holes 13, while preventing the plastic 31 from leaking from gaps between the iron core pieces 20.

(5) In the crushing step, the tabs 21a are crushed such that the protruding end of each tab 21a protruding from the through-hole 22a is located inside the through-hole 22a.

In a case in which the tab 21a protrudes from the through-hole 22a, which opens in the first end face 11a of the rotor core 11, a gap may be created between the first die 50 and the first end face 11a when the first die 50 is caused to contact the first end face 11a. Also, in a case in which the tab 21a protrudes from the through-hole 22a, which opens in the second end face 11b of the rotor core 11, a gap may be created between the second die 60 and the second end face 11b when the second die 60 is caused to contact the second end face 11b. In these cases, the plastic 31 may leak through the gap between the rotor core 11 and the first die 50 or the second die 60.

In this regard, in the above-described method, the tabs 21a are crushed such that the protruding end of each tab 21a is located inside the through-hole 22a before the injection step. Accordingly, a gap is unlikely to be created between the rotor core 11 and the first die 50 or the second die 60, so that the plastic 31 is prevented from leaking through that gap.

Also, with the above-described method, the contact area between the first die 50 and the first end face 11a is increased as compared to a case in which the injection step is performed with the tabs 21a protruding from the through-holes 22a in the first end face 11a of the rotor core 11. This allows the heat of the heated first die 50 to be readily transferred to the rotor core 11. This shortens the time required to raise the temperature of the rotor core 11 to a desired temperature.

Modifications

The above-described embodiment may be modified as follows. The above-described embodiment and the following modifications can be combined as long as the combined modifications remain technically consistent with each other.

Figure 9:
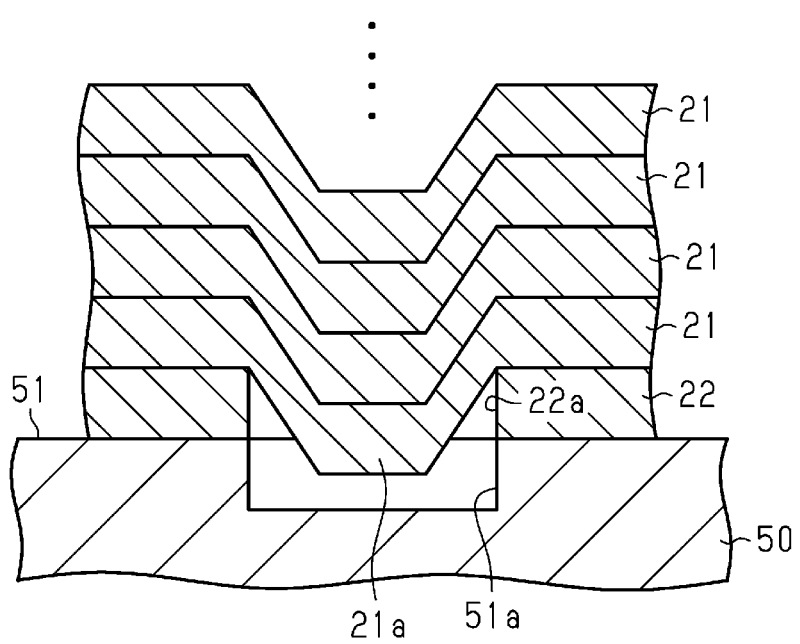
FIG. 9 is a cross-sectional view of a first die according to a modification.

As shown in FIG. 9, the first die 50 may include multiple accommodating recesses 51a formed in the first contacting surface 51. Each accommodating recess 51a accommodates the protruding end of a tab 21a that projects from a through-hole 22a that opens in the first end face 11a. In this case, in the injection step, the plastic 31 is injected into the magnet housing holes 13 with the protruding ends of the tabs 21a protruding from the through-holes 22a accommodated in the accommodating recesses 51a. With this configuration, when the first die 50 contacts the first end face 11a of the rotor core 11, the protruding ends of the tabs 21a are accommodated in the accommodating recesses 51a. Accordingly, as compared to a case in which the first die 50 does not have the accommodating recesses 51a, the contact area between the first die 50 and the first end face 11a is increased. This allows the heat of the heated first die 50 to be readily transferred to the rotor core 11. This shortens the time required to raise the temperature of the rotor core 11 to a desired temperature. Also, this modification omits the crushing step in the above-described embodiment.

The rotor core 11 may be formed by stacking multiple core piece blocks, which are each formed by stacking multiple first iron core pieces 21 and one second iron core piece 22. In this case, the core piece blocks are fixed to each other with, for example, the plastic 31.

The first iron core pieces 20 do not necessarily need to be joined to each other by press-fitting the tabs 21a to each other. The iron core pieces 20 may be joined to each other by, for example, the plastic 31

In the pressing step, the flow space S does not necessarily need to be created between the second die 60 and each magnet 30. In this case, each gate 68 is preferably set at a position that is not aligned with the magnet 30 in a range of the corresponding magnet housing hole 13, that is, at a position that does not face the magnet 30.

The pressing step does not necessarily need to be performed before the injection step.

The heating temperature of the first die 50 may be higher than the heating temperature of the die body 61. In this case, since the temperature gradient in the stacking direction of the magnet housing holes 13 decreases, the temperature of the plastic 31 injected into the magnet housing holes 13 is unlikely to decrease.

In the heating step, the die body 61 does not necessarily need to be heated. In this case, since the gate plate 65 is not heated, the plastic 31 remaining in the passage P hardens at an early stage. This allows the gate plate 65 to be separated from the rotor 10 at an early stage after the hardening step.

The manufacturing apparatus 40 may include a movable first die 50 and a fixed second die 60. In this case, clamping is performed by bringing the first die 50 close to the rotor core 11 mounted on the second die 60.

The gate plate 65 may be coupled to the second die 60 in a relatively movable manner.

In the injection step, the plastic 31 may be injected immediately after the energization of the first heater 52 and the second heater 63 is stopped. That is, if the rotor core 11 is heated to be in a desired temperature range immediately before the plastic 31 is injected, the energization of the first heater 52 and the second heater 63 may be stopped before the plastic 31 is injected.

The gate plate 65 may be omitted from the second die 60. In this case, it suffices if a flow passage P that corresponds to the runners 67 and the gates 68 is formed in the second die 60.

The first die 50 may include a side wall that protrudes from the first contacting surface 51 and surrounds the outer circumferential surface of the rotor core 11. The side wall may contact the outer circumferential surface of the rotor core 11. A gap may be created between the outer circumferential surface of the rotor core 11 and the side wall.

Since the use of such a first die 50 limits heat radiation from the outer circumferential surface of the rotor core 11, the heating efficiency of the rotor core 11 by the first die 50 is improved.

The rotor core 11 may be preheated prior to the injection step.

In the hardening step, the rotor 10 may be cooled by using the first die 50 and the second die 60, which each include a cooling passage.

The plastic 31 is not limited to a liquid crystal polymer and may be, for example, polyphenylene sulfide (PPS), polyetherether ketone (PEEK), or polyamide (PA).

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A method for manufacturing a rotor, the rotor including a rotor core that includes a magnet housing hole and a magnet that is accommodated in the magnet housing hole and fixed to the rotor core with a thermoplastic, the rotor core having a first end face and a second end face, which is located on a side opposite to the first end face, the magnet housing hole opening in the first end face and the second end face, the method comprising:

with the magnet accommodated in the magnet housing hole, causing a first die to contact the first end face and causing a second die to contact the second end face, the second die including a passage through which the thermoplastic flows; and injecting the thermoplastic into the magnet housing hole through the passage in a state in which the first die and the second die are respectively in contact with the first end face and the second end face and the first die is heated, wherein the first die is heated by energizing a first heater provided in the first die, and the first die is in direct contact with the first end face during the injecting of the thermoplastic into the magnet housing hole.

2. The manufacturing method according to claim 1, wherein the injecting the thermoplastic includes injecting the thermoplastic in a state in which the second die is heated.

3. The manufacturing method according to claim 1, wherein the rotor core includes stacked iron core pieces, the method further comprises, prior to injecting the thermoplastic, pressing the second end face with the second die, thereby pressing the first end face against the first die, and the injecting the thermoplastic includes injecting the thermoplastic in a state in which the first end face is pressed against the first die.

4. The manufacturing method according to claim 3, wherein the rotor core has a stacking height, the stacking height being a dimension from the first end face to the second end face, a length of the magnet in a stacking direction of the iron core pieces is shorter than the stacking height, and the pressing the second end face with the second die includes pressing the second end face such that a flow space in which the thermoplastic flows is created between the second die and the magnet in the stacking direction, while reducing the stacking height by causing the iron core pieces to closely contact each other in the stacking direction.

5. The manufacturing method according to claim 1, wherein the rotor core includes stacked iron core pieces, the iron core pieces include:

first iron core pieces that include tabs that bulge on one side in a stacking direction of the iron core pieces, the first iron core pieces being stacked with the tabs being joined to each other; and a second iron core piece including a through-hole into which the tab of the first iron core piece adjacent to the second iron core piece in the stacking direction is inserted, the second iron core piece forming the first end face or the second end face, and the method further comprises, prior to injecting the thermoplastic, pressing a protruding end of the tab protruding from the through-hole, thereby crushing the tab such that the protruding end is located inside the through-hole.

6. The manufacturing method according to claim 1, wherein the rotor core includes stacked iron core pieces, the iron core pieces include:

first iron core pieces that include tabs that bulge on one side in a stacking direction of the iron core pieces, the first iron core pieces being stacked with the tabs being joined to each other; and a second iron core piece including a through-hole into which the tab of the first iron core piece adjacent to the second iron core piece in the stacking direction is inserted, the second iron core piece forming the first end face, and the injecting the thermoplastic includes injecting the thermoplastic in a state in which a protruding end of the tab protruding from the through-hole is accommodated in an accommodating recess formed in the first die.

7. The manufacturing method according to claim 2, wherein the second die is heated by energizing a second heater provided in the second die.

8. A method for manufacturing a rotor, the rotor including a rotor core that includes a magnet housing hole and a magnet that is accommodated in the magnet housing hole and fixed to the rotor core with a thermoplastic, the rotor core having a first end face and a second end face, which is located on a side opposite to the first end face, the magnet housing hole opening in the first end face and the second end face, the method comprising:

with the magnet accommodated in the magnet housing hole, causing a first die to contact the first end face and causing a second die to contact the second end face, the second die including a passage through which the thermoplastic flows; and injecting the thermoplastic into the magnet housing hole through the passage in a state in which the first die and the second die are respectively in contact with the first end face and the second end face and the first die is heated, wherein the injecting the thermoplastic includes injecting the thermoplastic in a state in which the second die is heated.

* * * * *